United States Patent
Kawazoe et al.

(10) Patent No.: US 7,658,997 B2
(45) Date of Patent: Feb. 9, 2010

(54) MULTIPLY STRUCTURED PARTICLE AND METHOD FOR PRODUCING THE SAME

(75) Inventors: Yoshiyuki Kawazoe, 19-24 Minamiyoshinari 2-chome, Aoba-ku, Sendai-shi, Miyagi-ken (JP); Atsuo Kasuya, 13-5 Kamo 1-chome, Izumi-ku, Sendai-shi, Miyagi-ken (JP)

(73) Assignees: Yoshiyuki Kawazoe, Miyagi-Ken (JP); Atsuo Kasuya, Miyagi-Ken (JP); Masanobu Satake, Miyagi-Ken (JP); Moriaki Ohuchi, Miyagi-Ken (JP); Motohiro Takeda, Miyagi-Ken (JP); Dow Corning Toray Co., Ltd., Tokyo (JP)

( * ) Notice: Subject to any disclaimer, the term of this patent is extended or adjusted under 35 U.S.C. 154(b) by 592 days.

(21) Appl. No.: 10/540,379

(22) PCT Filed: Dec. 26, 2003

(86) PCT No.: PCT/JP03/17021

§ 371 (c)(1), (2), (4) Date: Jun. 23, 2005

(87) PCT Pub. No.: WO2004/060797

PCT Pub. Date: Jul. 22, 2004

(65) Prior Publication Data

US 2006/0204431 A1 Sep. 14, 2006

(30) Foreign Application Priority Data

Dec. 26, 2002 (JP) ............................ 2002-378407

(51) Int. Cl.
*B32B 5/66* (2006.01)

(52) U.S. Cl. .................. 428/403; 428/404; 428/405; 428/406; 427/212

(58) Field of Classification Search ......... 428/403–406; 427/212

See application file for complete search history.

(56) References Cited

U.S. PATENT DOCUMENTS 5,770,172 A 6/1998 Linehan et al.

FOREIGN PATENT DOCUMENTS

| EP | 0 601 594 | 12/1993 |
|---|---|---|
| JP | 59-162135 | 9/1984 |
| JP | 6-319986 | 11/1994 |
| JP | 6319986 | * 11/1994 |
| JP | 08-024626 | 1/1996 |
| JP | 2001-026407 | 1/2001 |
| WO | WO 01/88540 | 11/2001 |

OTHER PUBLICATIONS

Steigerwald et al "Surface derivatization and isolation of semicnductor cluster molecules" J.Am. Chem. Soc. 1988, 110, 3046-3050.*
English language Abstract for JP59-162135, Sep. 13, 1984.
"Nucleation and Growth of CdSe on ZnS Quantum Crystallite Seeds, and Vice Versa, In Inverst Micelle Media", A. R. Kortan et al. , J. Am. Chem. Soc. 1990, 112, pp. 1327-1332.
"Surface Derivatization And Isolation of Semiconductor Cluster Molecules", M. L. Steigerwald et al., J. Am. Chem. Soc. 1988, 110, pp. 3046-3050.
"Ultra-Stable Nanoparticles Of CdSe Revealed From Mass Spectrometry", Atsuo Kasuya et al. Nature Materials, vol. 3, Feb. 2004, pp. 99-102.
European Search Report for EP03786373, Dec. 20, 2006.
English language Abstract for JP 08-024626 extracted from *Searching PAJ* database dated Jun. 14, 2005.
English language Abstract for JP 6-319986 extracted from espacenet.com database dated Jun. 21, 2005.
English language Abstract for JP 2001-026407 extracted from *Searching PAJ* database dated Jun. 14, 2005.

* cited by examiner

*Primary Examiner*—Leszek Kiliman
(74) *Attorney, Agent, or Firm*—Howard & Howard Attorneys PLLC

(57) ABSTRACT

In the present invention, when hollow polyhedral fine particles consisting of atoms of a first element and atoms of a second element are produced, atoms of the first element and atoms of the second element are structured in a reversed micelle composed of a surfactant. Thereby, hollow polyhedral fine particles can be synthesized by simple and easy procedures.

20 Claims, 6 Drawing Sheets

MULTIPLY STRUCTURED PARTICLE AND METHOD FOR PRODUCING THE SAME

TECHNICAL FIELD

The present invention relates to a method for producing hollow fine particles, and particularly relates to a method for producing hollow polyhedral fine particles having a very small particle size on the order of nanometers. In addition, the present invention also relates to a novel hollow polyhedral fine particle produced by the aforementioned preparation method.

BACKGROUND ART

Hollow polyhedral nonsocial particles consisting of from several atoms to several thousand atoms exhibit physical properties which are different from those of bulk crystal structures consisting of the same atoms, and the physical properties of the nonsocial particles greatly vary in accordance with the number of structural atoms, the atomic arrangement states, and the like. For this reason, research thereon has been carried out from a broad perspective of them as "new materials" applicable to various uses.

As the hollow polyhedral particles described above, carbon fullerenes such as Chad 60 and the like are already known. However, hollow polyhedral fine particles which are stable in the atmosphere and are next to the carbon fullerenes in rank have not been discovered or created. In addition, the carbon fullerenes are synthesized by high energy consuming methods such as vapor growth methods, arching methods, and the like. Therefore, production costs of the carbon fullerenes are extremely high due to low production efficiency, and therefore, practical application thereof to various uses is inhibited.

DISCLOSURE OF THE INVENTION

A main object of the present invention is to synthesize hollow polyhedral fine particles in large amounts through simple organ chemical synthetic methods without using a large amount of energy.

In addition, another object of the present invention is to synthesize novel hollow polyhedral fine particles by the aforementioned organ chemical synthetic methods.

The objects of the present invention can be achieved by synthesizing hollow polyhedral fine particles in which, when hollow polyhedral fine particles consisting of atoms of a first element and atoms of a second element are produced, the aforementioned first element atoms and the aforementioned second element atoms are structured in a reversed micelle composed of a surfactant.

In particular, when hollow polyhedral fine particles consisting of atoms of the first element and atoms of the second element are produced, in the present invention, the desirable hollow polyhedral fine particles can be easily produced by essentially carrying out the steps described below:

a first step of dissolving or dispersing a surfactant, a compound containing atoms of the aforementioned first element, and a compound containing atoms of the aforementioned second element, in an aqueous medium to obtain an aqueous solution or an aqueous dispersion;

a second step of adding an oily medium to the aforementioned aqueous solution or aqueous dispersion to obtain a double phase contacting liquid in which an aqueous phase and an oily phase directly contact;

a third step of forming a reversed micelle composed of the aforementioned surfactant in the aforementioned oily phase of the aforementioned double phase contacting liquid; and a fourth step of structuring the aforementioned first element atoms and the aforementioned second element atoms in the aforementioned reversed micelle to obtain hollow polyhedral fine particles.

In the method for producing hollow polyhedral fine particles of the present invention, after the aforementioned fourth step, a fifth step of separating and recovering the aforementioned hollow polyhedral fine particles from the aforementioned oily phase is preferably carried out.

In the method for producing hollow polyhedral fine particles of the present invention, the aforementioned first element may be the same as the aforementioned second element, or alternatively may be different from the aforementioned second element.

In the case in which the aforementioned first element is different from the aforementioned second element, it is preferable that the aforementioned first element be Cod, and the aforementioned second element be Se. Thereby, novel hollow polyhedral fine particles having a chemical formula of $(CdSe)_{33}$ or $(CdSe)_{34}$ can be produced in large amounts with ease.

BEST MODE FOR CARRYING OUT THE INVENTION

Figure 1:
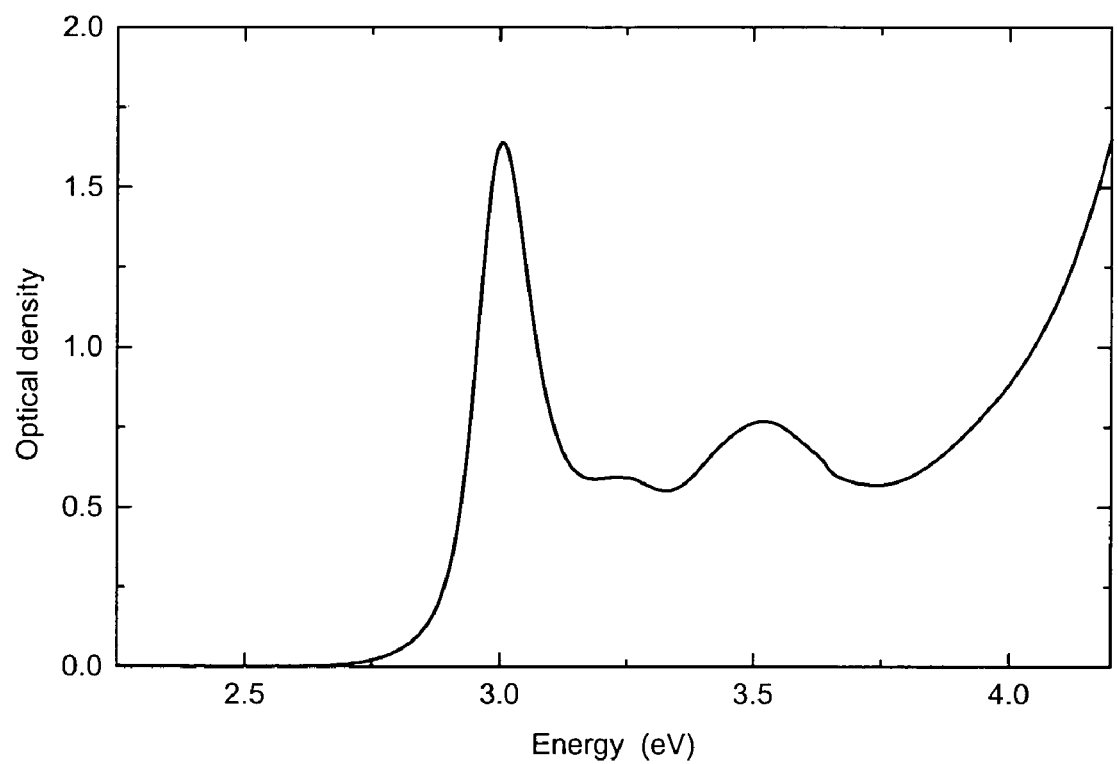
FIG. 1 is an optical absorption spectral chart of a product obtained in Example 1.

The method for producing the hollow polyhedral fine particles of the present invention is based on a technical idea in which hollow polyhedral fine particles consisting of a first element and a second element are produced by structuring the first element and the second element in a namespace in a reversed micelle formed by a surfactant. In the following, specific steps of carrying out the production method of the present invention are described in detail after each of the elements involved in the production method of the present invention is defined.

Definition of Terms:

(1) Hollow Polyhedral Fine Particles

"Hollow polyhedral fine particles" when employed in the present invention means individual very fine particles having a hollow cavity part within the particle. In the aforementioned particle, the aforementioned hollow cavity part is separated from the external world by a very thin shell having a polyhedron structure. The aforementioned polyhedron structure is not necessarily a regular polyhedron, and the surface thereof may be formed by various polygons such as triangles, quadrangles, pentagonal shapes, and the like.

The hollow polyhedral fine particles of the present invention have a size in which the distance between two atoms forming the aforementioned fine particle, which are the farthermost from each other, ranges from 0.1 to 20 nm, preferably ranges from 0.5 to 10 nm, more preferably ranges from 0.8 to 5.0 nm, and in particular, preferably ranges from 1.0 to 3.0 nm. The shapes of the hollow polyhedral fine particles are not particularly limited, and may be various shapes such as regular hexahedrons, cuboids, cylindrical bodies, plate-shaped bodies, general spherical bodies, and the like. When the hollow polyhedral fine particles are in the form of a general spherical body, the particle size of the aforementioned spheres corresponds to the size described above.

In addition, the inner spaces in the hollow polyhedral fine particles of the present invention preferably have a volume which can contain one or more atoms. By containing at least one atom in the aforementioned inner space, physical properties of the fine particles per se can greatly vary, compared with the case of containing no atoms in the inner space.

The hollow polyhedral fine particles of the present invention are different from a cluster of a bulk crystal composed of the atoms of one or more elements which are the same as those forming the aforementioned fine particles, and the inner spaces of the hollow polyhedral fine particles are not filled with atoms of the elements described above. That is, the hollow polyhedral fine particles of the present invention only have a shell structure formed from atoms of the elements constituting the aforementioned fine particles, and the inside thereof is completely hollow. It is not necessary to completely shield the inner space of the hollow polyhedral fine particle from the outside, and a part of the aforementioned inner space may be in communication with the outer world, but it is preferable that the inner space be completely shielded from the outer world.

(2) Structuring

"Structuring" when employed in the present invention means constructing a three-dimensional structure by accumulating the constituent elements. In particular, this means that a specific unit of atoms of the first element and atoms of the second element is accumulated to constitute a shell structure, thereby finally forming a hollow polyhedral fine particle.

The "unit" of atoms of the first element and atoms of the second element employed herein may be composed of atoms of the first element alone, atoms of the second element alone, or a combination of atoms of the first element and atoms of the second element. When the first element is different from the second element, a combination of the atoms of the first and second elements is preferably employed, and in particular, a combination of one first element atom and one second element atom is preferable in view of geometric properties of the shell structure. For example, when Cod is employed as the first element atom, and Se is employed as the second element atom, a hollow polyhedral fine particle can be constituted by structuring a combination of CdSe as a "unit".

(3) Surfactant

"Surfactant" when employed in the present invention means a well-known substance exhibiting surface active effects, and in particular, means a conventional surfactant in which a hydrophilic group and a hydrophobic group are present in one molecule. In general, a surfactant forms a micelle in an aqueous phase, or alternatively forms a reversed micelle in an oily phase, depending on the ratio of the molecular weight of the hydrophilic group and the molecular weight of the hydrophobic group in the molecule of the aforementioned surfactant. As the surfactant employed in the production method of the present invention, one which can form a reversed micelle is employed.

Specific Steps For Carrying Out The Method of the Present Invention:

(1) First Step

In the method for producing hollow polyhedral fine particles of the present invention, first, a surfactant, a compound containing atoms of the aforementioned first element, and a compound containing atoms of the aforementioned second element are dissolved or dispersed in an aqueous medium, and thereby an aqueous solution or an aqueous dispersion is obtained.

The kind of aqueous medium employed in the first step can be determined depending on the kinds of the first element, the second element, and/or the surfactant. As the aqueous medium, water; lower alcohols such as methanol, ethanol, propel alcohol, isopropyl alcohol, tart-butyl alcohol, and the like; ketenes such as acetone, methyl ethyl ketene, and the like; ethers such as diethyl ether, methyl ethyl ether, diethyl ether, and the like; and the like, can be employed, but the aqueous medium is not limited thereto. As the aqueous medium, water or alcohols are preferable. In particular, alcohols exhibit effects of accelerating formation of a reversed micelle composed of the surfactant in the third step described below. For this reason, a mixed medium of water and an alcohol is particularly preferable as the aqueous medium.

As the first element, the group II to VI elements are preferable, and the group II elements which can form a divalent action, such as Cod, Zn, and the like, are preferable. In particular, Cod is preferable. However, the first element is not limited thereto. As the second element, which is not particularly limited, the group II to VI elements are preferable, and the group VI elements which can form a divalent anion, such as S, Se, Te, and the like, are preferable. In particular, Se is preferable. Therefore, when the first element is different from the second element, in particular, a combination of Cod and Se is preferable. When the first element and the second element are the same, the group IV elements such as C, Si, Gee, and the like, which can form the different apparent oxidation values, are preferable, and in particular, Si is preferable.

The form of the compound containing atoms of the first element is not particularly limited. In view of solubility in an aqueous medium, compounds which can supply atoms of the first element as ions, and particularly captions, are preferable. For example, salts containing atoms of the first element as captions are preferable. For example, in the case of employing Cod as atoms of the first element, $CdSO_4$ or the like can be employed. $CdSO_4$ has a high solubility in water (76.7 g per 100 g of water), and for this reason, it is preferable. Similarly, the forms of the compounds containing atoms of the second element are not particularly limited. In view of solubility in an aqueous medium, compounds which can supply atoms of the second element as ions, and particularly anions, are preferable. For example, salts containing atoms of the second element as anions are preferable. For example, in the case of employing Se as atoms of the second element, $Na_2SeSO_3$ or the like can be employed.

When a compound such as a salt supplying the first element atoms as cations is employed as the compound containing atoms of the first element, and a compound such as a salt supplying the second element atoms as anions is employed as the compound containing atoms of the second element, large particles may be produced by reacting the first element atoms and the second element atoms immediately after mixing both the element atoms in some cases. For this reason, in order to prevent the aforementioned reaction, it is preferable that a chelating agent be present together therewith. The chelating agent encompasses the first element atoms and/or the second element atoms to form a cyclic structure and stabilize these. Thereby, the ratio of the first element atoms and/or the second element atoms both which are free in the reaction system is extremely limited, and the reaction between the first element atoms and the second element atoms is delayed, and thereby, formation of large particles can be controlled.

For example, in the case of employing Cd as the first element atoms, it is preferable that SNTA ($N(CH_2COONa)_3$) be present as a chelating agent together therewith. Thereby, as conceptualized in the following, the $Cd^{2+}$ ion present in the aqueous medium is stabilized by forming a cyclic structure due to coordinate bonds with the N atom and the O atom of SNTA. For this reason, the amount of the free $Cd^{2+}$ in the aqueous medium is extremely reduced, and the reaction rate of Cd2+ in the aqueous medium can be extremely reduced.

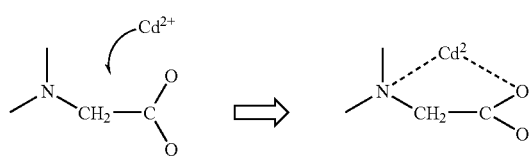

As surfactants, various surfactants such as nonionic, cationic, anionic, and amphoteric surfactants can be employed as long as they can form a reversed micelle in an oily phase. As examples of the surfactants, mention may be made of, for example, sulfate type anionic surfactants such as salts of $C_{12}$-$C_{18}$ saturated or unsaturated alkyl sulfuric acids, salts of $C_{12}$-$C_{18}$ saturated or unsaturated alkyl ether sulfuric acids, salts of $C_{12}$-$C_{18}$ saturated or unsaturated alkyl aryl ether sulfuric acids, and the like; sulfonate type anionic surfactants such as salts of $C_{12}$-$C_{22}$ saturated or unsaturated alkyl sulfonic acids, salts of $C_8$-$C_{22}$ saturated or unsaturated alkylbenzene sulfonic acids, salts of α-olefin sulfonic acids, and the like; carboxylic acid type anionic surfactants such as salts of $C_{12}$-$C_{18}$ saturated or unsaturated fatty acids, salts of $C_{12}$-$C_{18}$ saturated or unsaturated alkyl ether carboxylic acids, salts of N-acylglutamic acid, and the like; phosphate type anionic surfactants such as salts of $C_{12}$-$C_{18}$ saturated or unsaturated alkyl phosphoric acids, salts of POE mono- or di($C_8$-$C_{12}$ saturated or unsaturated alkyl) ether phosphoric acids, salts of $C_8$-$C_{12}$ saturated or unsaturated alkyl aryl ether phosphoric acids, and the like; alkylamine type anionic surfactants such as ($C_8$-$C_{12}$ saturated or unsaturated alkyl)amines, and the like; ammonium type cationic surfactants such as $C_{12}$-$C_{18}$ saturated or unsaturated alkylammonium chloride, $C_{12}$-$C_{18}$ saturated or unsaturated alkyl ether ammonium chloride, and the like; benzalkonium type cationic surfactants such as $C_{12}$-$C_{18}$ saturated or unsaturated alkyl dimethyl benzalkonium chloride, octylphenoxy ethoxyethyl dimethylbenzylammonium chloride, and the like; betaine type amphoteric surfactants such as di($C_8$-$C_{12}$ saturated or unsaturated alkyl) diaminoethyl betaines, $C_{12}$-$C_{18}$ saturated or unsaturated alkyl dimethylbenzyl betaines, and the like; glycine type amphoteric surfactants such as $C_{12}$-$C_{18}$ saturated or unsaturated alkyl dimethylbenzyl glycine, and the like; polyoxyethylene/polyoxypropylene block polymer type nonionic surfactants such as polyoxyethylene/polyoxypropylene block polymers, $C_{12}$-$C_{18}$ saturated or unsaturated alkyl/polyoxyethylene/polyoxypropylene block polymer ethers, and the like; sugar ester type nonionic surfactants such as sorbitan $C_{12}$-$C_{18}$ fatty acid esters, POE-sorbitan $C_{12}$-$C_{18}$ fatty acid esters, and the like; fatty acid ester type nonionic surfactants such as POE-$C_{12}$-$C_{18}$ fatty acid esters and the like; POE ether type nonionic surfactants such as POE-($C_8$-$C_{12}$ saturated or unsaturated alkyl) ethers, POE-($C_8$-$C_{12}$ saturated or unsaturated alkyl) phenyl ethers, and the like; silicone type nonionic surfactants such as POE-modified silicones, and the like, which are known surfactants. One kind of surfactant may be employed or surfactants may be employed in combination of two or more kinds thereof.

The surfactants employed in the present invention are preferably those which can be easily dissolved or dispersed in the aqueous medium. In addition, in the second step described below, the surfactants employed in the present invention are preferably those which do not inhibit direct contact between the aqueous phase and the oily phase, and can easily form a large amount of reversed micelles in the oily phase. As examples of surfactants having the preferable properties described above, mention may be made of, for example, one-dimensional anionic surfactants having $C_8$-$C_{22}$ long-chain saturated alkyl groups, and in particular, long-chain saturated alkyl amines having $NH_2$— groups as hydrophilic groups, and octyl ($CH_3(CH_2)_7$) groups, decyl ($CH_3(CH_2)_9$) groups, dodecyl ($CH_3(CH_2)_{11}$) groups, or the like, as hydrophobic groups.

In addition, the size of the space in the reversed micelle which the surfactant forms in the second step described below tends to depend on the size of the molecule of the surfactant, per se. For this reason, by selecting a surfactant having an appropriate molecular length, the diameter of the nanospace for the reaction in the reversed micelle can be controlled. For example, if the bond lengths of C—C, C—H, C—N, and N—H are respectively 1.54 angstroms, 1.10 angstroms, 1.47 angstroms, and 1.00 angstroms, the molecular length of the decylamine ($CH_3(CH_2)_9NH_2$) is approximately 1.8 nm, and for this reason, the nanospace in the reversed micelle can be a spherical space having a diameter of not more than approximately 2 nm. As described above, by properly selecting the surfactants, the size of the hollow polyhedral fine particles finally produced can be controlled.

Dissolving or dispersing the compound containing the first element atoms, the compound containing the second element atoms, and the surfactant in the aqueous medium can be carried out by means of a known stirring and mixing apparatus such as a contacting type of mixing and stirring apparatus with a stirrer such as a magnetic stirrer or the like, a rotor-stator type mixing and stirring apparatus such as a colloid mill, a homogenizer, or the like, or a non-contacting type mixing and stirring apparatus employing ultrasonic waves or the like.

The specific methods for adding the compound containing the first element atoms, the compound containing the second element atoms, and the surfactant to the aqueous medium are not particularly limited. They may be respectively added to the aqueous medium as they are, or alternatively, they may be formed into a small amount of an aqueous solution or an aqueous dispersion, followed by adding to the aforementioned aqueous medium. In the case of previously producing a small amount of the aqueous solution or the aqueous dispersion which includes the compound containing the first element atoms and/or the compound containing the second element atoms, in order to control the states of the first element atoms and the second element atoms in the aforementioned solution or dispersion, it is preferable that the pH of the aforementioned aqueous solution or aqueous dispersion be previously set in a specific range.

The order of adding the compound containing the first element atoms, the compound containing the second element atoms, and the surfactant to the aqueous medium is not particularly limited. For example, a mixture of the compound containing the first element atoms (or the aqueous solution or aqueous dispersion thereof) and the surfactant is added to the aqueous medium, and subsequently, the compound containing the second element atoms (or the aqueous solution or aqueous dispersion thereof) can be added thereto.

The temperature of the aqueous phase obtained by dissolving or dispersing the compound containing the first element atoms, the compound containing the second element atoms, and the surfactant in the aqueous medium is preferably controlled to be in a specific range. In the case of extremely high temperatures, the reaction rate of the first element atoms and the second element atoms is increased, and a large particle may be produced. On the other hand, in the case of extremely low temperatures, the rate of dissolving or dispersing the compound containing the first element atoms, the compound containing the second element atoms and the surfactant in the aqueous medium is decreased in the aqueous medium. Therefore, the temperature of the aqueous phase is preferably controlled to be in an appropriate range. The specific temperature range depends on the kinds of the first element, the second element, and the surfactant, and depends on other factors. The temperature is controlled typically to be in the range of 15° C. to 80° C., more typically in the range of 20° C. to 75° C., and in particular, typically in the range of 25° C. to 75° C.

When the aforementioned aqueous phase contains a chelating agent, the pH of the aforementioned aqueous phase is preferably controlled to be in an appropriate range. The specific pH range depends on the kinds of the first element, the second element, and the chelating agent, and depends on other factors. For example, in the case of employing Cd as the first element and employing SNTA as the chelating agent, in order to secure stability of the chelate, the pH is controlled typically to be in the range of from 8 to 12, and more typically in the range of from 9 to 11. More particularly, the pH of the aqueous phase can be adjusted by adding an acid such as hydrochloric acid, sulfuric acid, nitric acid, formic acid, acetic acid, citric acid, or the like, or a base such as sodium hydroxide, potassium hydroxide, sodium carbonate, ammonia, or the like.

(2) Second Step

In the method for producing hollow polyhedral fine particles of the present invention, there is a second step in which an oily medium is added to an aqueous phase obtained in the first step to obtain a double phase contacting liquid in which the aqueous phase and the oily phase directly contact.

The specific kind of oily medium employed in the second step is determined depending on the kinds of the first element, the second element, and/or the surfactant. As the oily medium, vegetable oils such as olive oil, castor oil, and the like; saturated hydrocarbons such as pentane, hexane, cyclopentane, cyclohexane, liquid paraffin, and the like; aromatic hydrocarbons such as benzene, xylene, toluene, and the like; esters such as isopropyl myristate, 2-octyldodecyl myristate, and the like; higher alcohols such as isostearyl alcohols, and the like; higher fatty acids such as stearic acid, lauric acid, and the like; silicone oils such as dimethylpolysiloxane, methylphenylpolysiloxane, and the like; and the like, can be employed. However, the oily medium is not limited thereto.

In the second step, it is necessary to obtain a condition in which the aqueous phase directly contacts the oily phase without via the surfactant, after adding the oily medium to the aqueous phase. Due to direct contact between the aqueous phase and the oily phase, the surfactant in the aqueous phase can migrate in the oily phase together with the first element atoms and the second element atoms.

The addition of the oily medium to the aqueous phase is preferably carried out immediately after formation of the aqueous phase. Soon after forming the aqueous phase by dissolving or dispersing the compound containing the first element atoms, the compound containing the second element atoms, and the surfactant in the aqueous medium, the reaction between the first element atoms and the second element atoms begins in the aforementioned aqueous phase or this reason, by adding the oily medium immediately after formation of the aqueous phase, excess chain reactions can be prevented, and the first and second element atoms can rapidly immigrate into the oily phase together with the surfactant.

The double phase contacting liquid in which the aqueous phase directly contacts the oily phase is preferably under a condition in which the continuous aqueous phase and the continuous oily phase form layers above and below, and they directly contact each other. If necessary, the double phase contacting liquid may be mixed and stirred using a stirrer such as a magnetic stirrer or the like or using ultrasonic waves.

The temperature of the double phase contacting liquid is preferably a temperature of not lower than the Kraft point of the surfactant. By having the temperature of not lower than the Kraft point of the temperature of the double phase contacting liquid, the formation of the reversed micelles in the oily phase in the third step described below can be accelerated. The specific temperature range of the double phase contacting liquid depends on the kinds of the surfactants and depends on other factors, and is controlled typically to be in the range of 15° C. or higher, more typically in the range of 20° C. or higher, and in particular, typically in the range of 25° C. or higher. The concentration of the surfactant in the oily phase of the double phase contacting liquid at the Kraft point approximately equals the critical (reversed) micelle concentration.

(3) Third Step

In the method for producing hollow polyhedral fine particles of the present invention, next, a third step in which reversed micelles composed of the surfactant are formed in the oily phase of the double phase contacting liquid obtained in the second step is carried out.

The temperature of the oily phase during forming the reversed micelles is preferably not lower than the Kraft point of the surfactant, but is preferably not higher than the temperature at which the formation of the reversed micelles is not inhibited. If the temperature is too high, frequency of collisions between the reversed micelles in the oily phase is raised, and the reversed micelles are broken. Therefore, it is not preferable. The specific temperature range of the oily phase during forming the reversed micelles depends on the kinds of the surfactants and depends on other factors. It is controlled typically to be in the range of from 15° C. to 80° C., more typically in the range of from 20° C. to 75° C., and in particular, typically in the range of from 25° C. to 75° C. For example, in the case of employing decylamine as the surfactant, the temperature of the oily phase is controlled to be from 25° C. to 60° C.

The reversed micelles are formed from the surfactant which immigrates from the aqueous phase into the oily phase, and the first element atoms and the second element atoms are incorporated into the nanospace of the aforementioned reversed micelles. The nanospaces in the reversed micelles are the aqueous phase, and for this reason, both the first element atoms and the second element atoms are preferably in a hydrophilic state. In this case, the first element atoms and the second element atoms can be intensively incorporated into the aforementioned nanospace. As examples of the hydrophilic states of the first element atoms and the second element atoms, mention may be made of an ionic state of each of the element atoms or a water-soluble combination of the first and second element atoms.

By heating the oily phase to not lower than the Kraft point of the surfactant the formation of the reversed micelles is almost automatically carried out. For this reason, other specific treatments in order to form the reversed micelles are unnecessary. If necessary, the aqueous medium or the oily medium may be added to in order to obtain a desired range of the volume ratio of the aqueous phase or the oily phase.

(4) Fourth Step

In the method for producing hollow polyhedral fine particles of the present invention, next, a fourth step in which the first element atoms and the second element atoms are structured in the reversed micelles formed in the third step to produce hollow polyhedral fine particles is carried out.

It is believed that the first element atoms and the second element atoms incorporated into the nanospace in the reversed micelle are respectively and independently structured to form a shell structure of the hollow polyhedral fine particle, or alternatively, a specific unit is formed by combining a specific ratio of the first element atoms and the second element atoms, and the aforementioned unit is structured to form a shell structure of the hollow polyhedral fine particle. The former or latter structuring method described above may be carried out, depending on the kinds of the first element and the second element, and depending on other factors.

The shell structure formed in the nanospace in the reversed micelle gradually grows, but finally, this is limited to the size of the aforementioned nanospace, and thereby, a hollow polyhedral fine particle having a very minute size is formed. The geometrical structures and compounds of the hollow polyhedral fine particles depend on the kinds of the first element and the second element and depends on stability of the aforementioned geometrical structures or the like. For example, in the case of employing Cd as the first element and employing Se as the second element, hollow polyhedral fine particles represented by the chemical formulae $(CdSe)_{33}$ and $(CdSe)_{34}$ can be formed. This reveals that the hollow polyhedral fine particles composed of only Cd and Se are stabilized in specific numbers (magic numbers) of Cd and Se atoms. As described above, in the present invention, hollow polyhedral fine particles having a stable structure depending on the kinds of the elements employed can be produced.

Typically, the fourth step is successively carried out after the aforementioned third step. The fourth step is continued until the hollow polyhedral fine particles are completely produced in the reversed micelles formed in the third step. The reaction is continued by controlling the temperature of the oily phase of the double phase contacting liquid in the same manner as described in the third step, typically for 10 minutes to 2 hours, more typically for 10 minutes to one hour, and further more typically for 10 minutes to 30 minutes.

(5) Fifth Step

In the method for producing the hollow polyhedral fine particle of the present invention, after the fourth step, a fifth step in which the hollow polyhedral fine particles produced from the oily phase are separated and recovered is preferably carried out.

Typically, the fifth step is carried out by separating the oily phase from the double phase contacting liquid by means of a separating funnel or the like, and further separating the aforementioned oily phase into solid and the liquid by means of filtration, centrifuging, or the like, thus recovering the hollow polyhedral fine particles on which the surfactant is adhered. Subsequently, if necessary, the surfactant is removed from the hollow polyhedral fine particles, and the fine particles are dried. Thus, the hollow polyhedral fine particles can be produced.

By intentionally leaving the surfactant on the surface of the hollow polyhedral fine particles, a form in which chemical modification due to the surfactant is performed on the surface of the hollow polyhedral fine particle can be obtained. As described above, by varying the surface properties of the hollow polyhedral fine particles, the hollow polyhedral fine particles can be regularly arranged. For example, in the case of employing Cd as the first element, employing Se as the second element, and employing decylamine as the surfactant, particles of $(CdSe)_{33}$ and $(CdSe)_{34}$ can be regularly arranged via the decylamine molecules.

EXAMPLES

In the following, the present invention is described in detail by way of Examples. It should be understood that the present invention is not limited to these Examples.

Synthesis of Hollow Polyhedral Fine Particles of $(CdSe)_{33}$ and $(CdSe)_{34}$:

In the present Example, hollow polyhedral fine particles were produced employing Cd as the first element and employing Se as the second element. The raw materials employed in the present Example are described in the following.

Compound containing atoms of the first element: $CdSO_4$

Compound containing atoms of the second element: $Na_2SeSO_3$

Surfactant: saturated long-chain alkylamine

Example 1

(1) Preparation of Solution A $CdSO_4$, in an amount of 2.75 mmol, was dissolved in 7 ml of water, and 3.5 mmol of trisodium nitrilotriacetate (STNA: $N(CH_2COONa)_3$) as a chelating agent was further dissolved therein. The mixture was stirred for 5 minutes at room temperature, thus producing Solution A.

As conceptually shown in the scheme described below, SNTA and the free $Cd^{2+}$ in the reaction system form a chelate in Solution A. For this reason, the concentration of $Cd^{2+}$ in the aqueous medium is very small.

$$CdSO_4 \rightarrow Cd^{2+} + SO_4^{2-}$$

$$Cd^{2+} + NTA^{3-} \leftrightarrows Cd(NTA)^- + NTA^{3-} \leftrightarrows Cd(NTA)^{4-}$$

In addition, due to the reduced concentration of $Cd^{2+}$, production of $Cd(OH)_2$ can be prevented under alkaline conditions in the aqueous solution containing $Cd^{2+}$ ions.

(2) Preparation of Solution B

Selenium powder, in an amount of 0.8612 mmol, and 4.247 mmol of sodium sulfite ($Na_2SO_3$) were dissolved in 17 ml of water, and the mixture was stirred for 2 days at 90° C., thus producing Solution B. The chemical reactions in Solution B can be conceptually shown by the reaction scheme described below.

$$Se + Na_2SO_3 \rightarrow NaHSe + Na_2HSO_3$$

$$NaHSe \rightarrow HSe^- + Na^+$$

$Na_2SO_3$ functioned as a reducer in order to ionize Se.

The $HSe^-$ ion reacts with oxygen in the air as shown in the following.

$$2HSe^- + O_2 \rightarrow Se + 2OH^-$$

For this reason, in accordance with increase of pH, the ion concentration in Solution B is decreased. Therefore, in the present Example, the surrounding area of Solution B was filled with an inert gas to avoid contact between the air and Solution B.

(3) Preparation of a Mixed Liquid of Solution A and a Surfactant

Subsequently, in a conical flask equipped with a magnetic stirrer, 14 ml of Solution A and 4 mmol of a surfactant were mixed, and 10 ml of methanol, 10 ml of hydrochloric acid, and 10 ml of water were mixed therewith. As the surfactant, decyamine ($CH_3(CH_2)_9NH_2$) was employed.

Decylamine has a specific ratio of the molecular weight of the hydrophilic group ($NH_2$—) and the molecular weight of the hydrophobic group ($CH_3(CH_2)_9$), that is, hydrophilic group:hydrophobic group=16:141. Therefore, the proportion of the hydrophobic group is high, and for this reason, decylamine is advantageous to form a reversed micelle in an oily phase. In addition, decylamine can be easily dissolved in water. For this reason, a large amount of decylamine can be dissolved in an aqueous phase. Therefore, in the subsequent step, a large amount of reversed micelles can be produced in the oily phase.

During mixing of Solution A, decylamine, methanol, and hydrochloric acid, the conical flask was heated on a hot plate. Thereby, the temperature of the mixed solution was in the range of from 40° C. to 60° C. During mixing, uniformity of the temperature of the mixed solution was ensured by stirring the mixed solution with a magnetic stirrer. By mixing with hydrochloric acid, the pH of the mixed solution was maintained at alkaline pH 9 to pH 11. Stirring of the mixed solution was continued for 25 minutes.

(4) Mixing with Solution B

Solution B, in an amount of 12 ml, was added to the aforementioned mixed solution. Thereby, the Cd ions and the Se ions (accurately $HSe^-$ ions) in the system were reacted to form CdSe. The Cd ions were chelated by STNA, and the concentration of the Se ions was low. For this reason, it is believed that the reaction rate of the Cd ions and the Se ions was considerably slow. However, growth of CdSe proceeded, and for this reason, the subsequent step was carried out immediately.

(5) Mixing of an Oily Medium

Immediately after Solution B was added to the aforementioned mixed solution, 30 ml of toluene was mixed therein as an oily medium, thus producing a double phase separating liquid in which the continuous aqueous phase directly contacted the continuous oily phase. Furthermore, 30 ml of distilled water was added to the aqueous phase. It was observed that reversed micelles were formed by decylamine in the oily phase in the double phase separating liquid immediately after toluene was mixed. The temperature of the double phase separating liquid was maintained in the range of from 40° C. to 60° C.

(6) Separation of the Product

After 25 minutes, the double phase separating liquid in the conical flask was poured into a separating funnel, and the aqueous phase and the oily phase were separated. The oily phase was centrifuged by means of a centrifuge, and the obtained sedimented product was separated out, thus obtaining 8 mg of yellow-green powder.

Example 2

A powder product was produced by repeating the procedures described in Example 1 under the same conditions as those of Example 1, with the exception of replacing the decylamine of Example 1 with octylamine ($CH_3(CH_2)_7NH_2$).

Example 3

A powder product was produced by repeating the procedures described in Example 1 under the same conditions as those of Example 1, with the exception of replacing the decylamine of Example 1 with dodecylamine ($CH_3(CH_2)_{11}NH_2$)

Identification of $(CdSe)_{33}$ and $(CdSe)_{34}$ Hollow Polyhedral Fine Particles:

(1) Optical Absorption Spectrum Analysis

The product obtained in Example 1, in an amount of 5 mg, was dissolved in 20 ml of toluene, and the optical absorption spectrum thereof in the range of 2.0 eV to 4.5 eV was obtained. The results are shown in FIG. 1. The bulk CdSe had an absorption peak at 1.7 eV, and the product of Example 1 had an absorption peak at 3.0 eV. Therefore, it could be confirmed that the product of Example 1 was a different compound from the bulk CdSe. The sharpness of the absorption spectra reveals that the sample is single in atom level.

Mass Analysis

The product obtained in Example 1 was subjected to mass analysis under linear mode conditions by means of a time of flight method. The measured sample was prepared by dropping a toluene solution of the product on a target plate of a spectrometer and drying this. Decylamine of the surfactant adhering to the surface of the product was evaporated and removed by irradiation with a nitrogen laser. The results are shown in FIG. 2.

Figure 2:
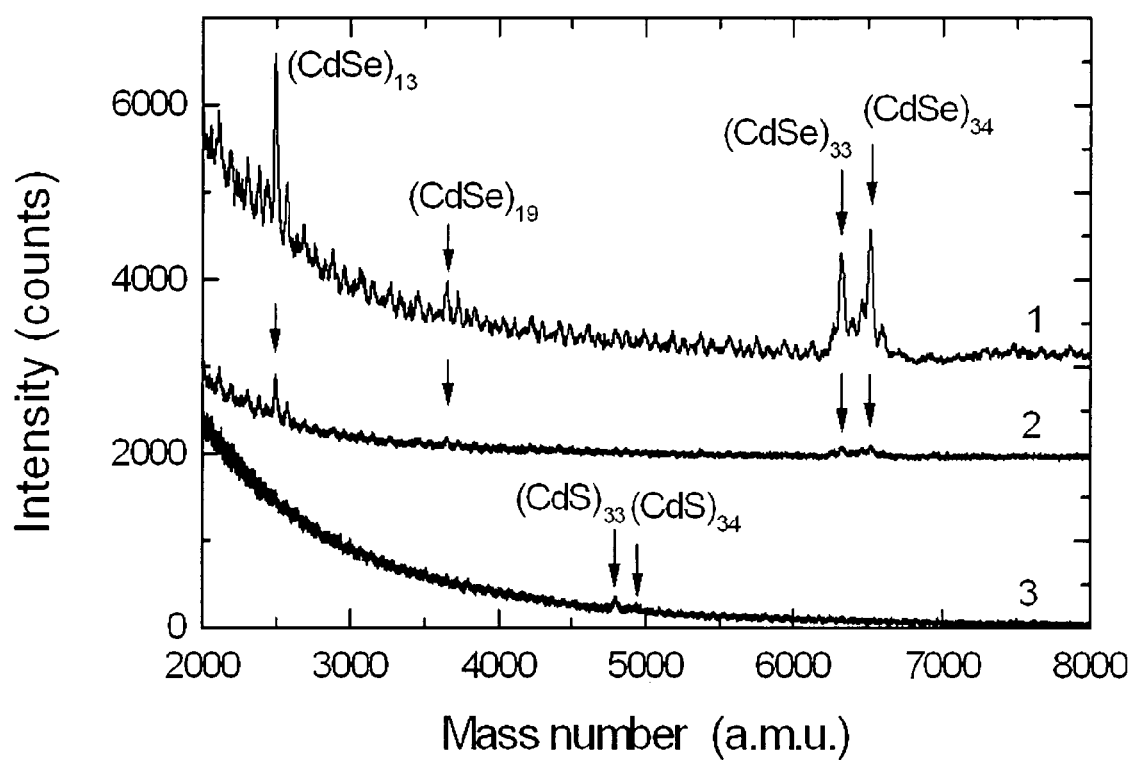
FIG. 2 is a mass spectral chart of the product obtained in Example 1.

The peak width in FIG. 2 indicates a binary isotope distribution of Cd and Se. A strong peak was observed at n=13, sharp peaks were observed at n=33 and at n=34. In addition, a weak peak was observed at n=19. Therefore, the peaks were respectively identified with $(CdSe)_{13}$, $(CdSe)_{33}$, $(CdSe)_{34}$, and $(CdSe)_{19}$. FIG. 2 shows that $(CdSe)_{33}$ and $(CdSe)_{34}$ were produced in abundance.

(3) Electron Microscope Analysis

Figure 3:
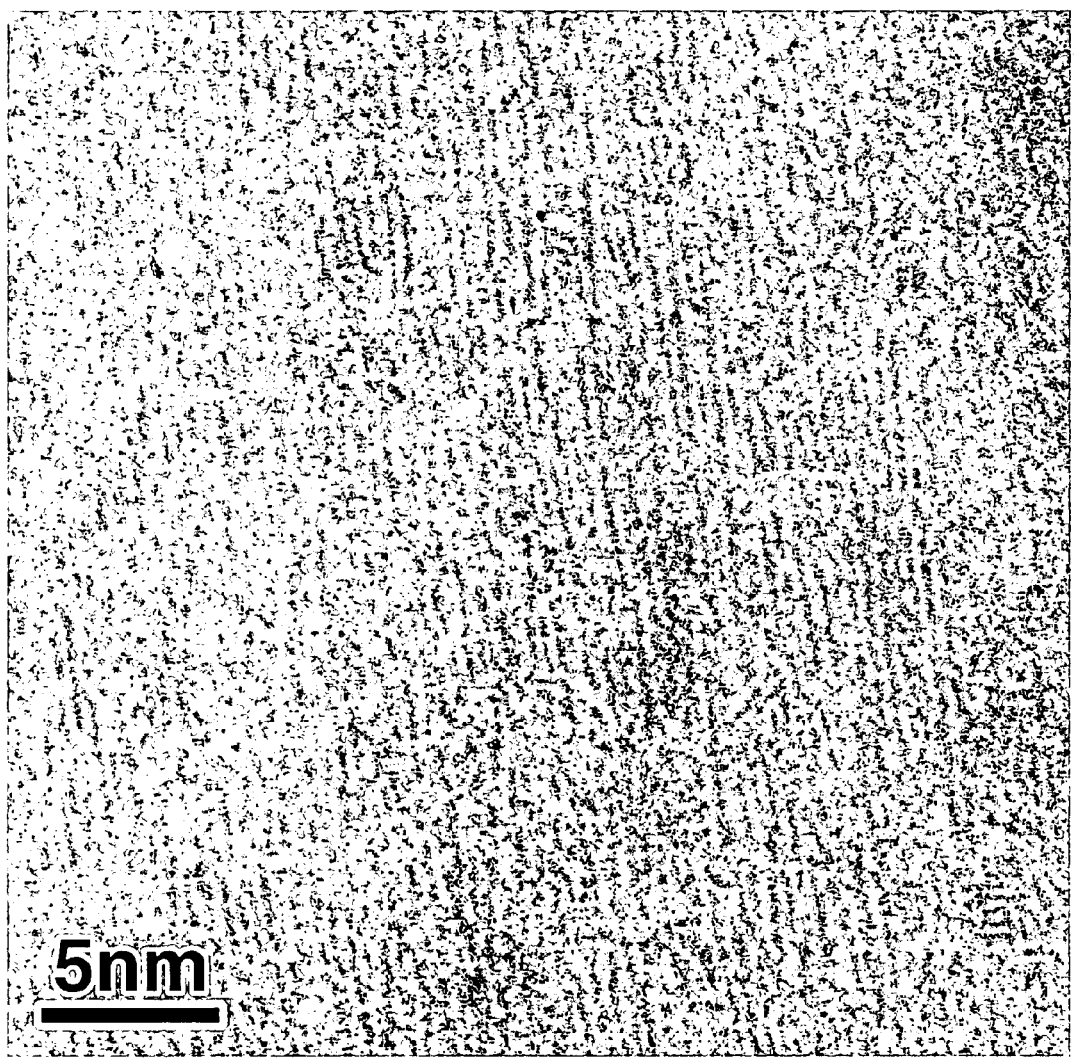
FIG. 3 is an electron microscope photo of the product obtained in Example 1.

The product obtained in Example 1 was subjected to electron microscope analysis under conditions of 400 KV employing a transmission model. The electron microscope photo is shown in FIG. 3. In FIG. 3, there were some very small nanoparticles having a particle size of not more than 2 nm, and the lattice fringe observed in bulk crystals could not be observed. Therefore, it could be seen that in Example 1, $(CdSe)_{33}$ and $(CdSe)_{34}$ particles which were not CdSe bulk crystals were actually produced, and that the particle size of the aforementioned particles ranged from approximately 1.2 to 1.7 nm.

(4) Theoretical Calculation

Figure 4:
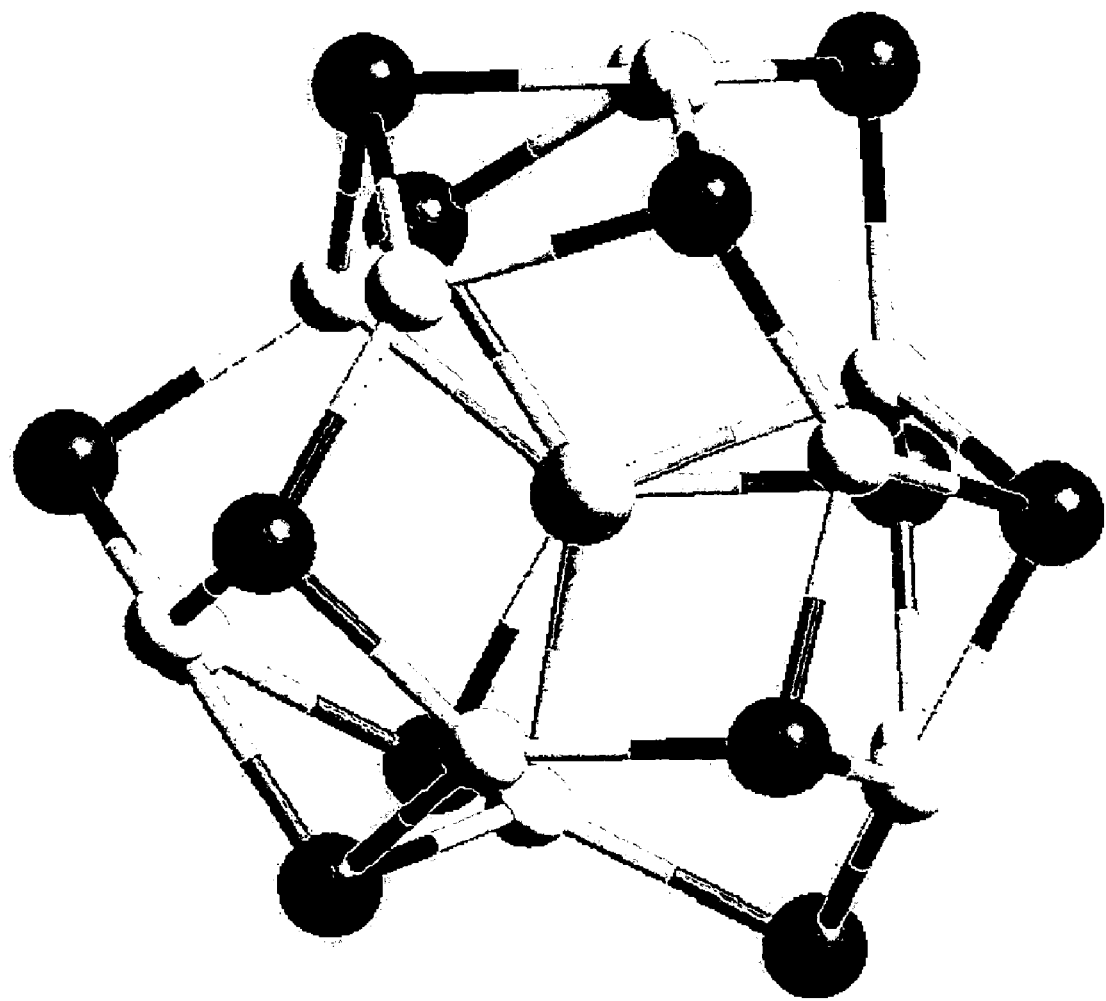
FIG. 4 is a first drawing showing a stable structure of $(CdSe)_{33}$ and $(CdSe)_{34}$.
Figure 5:
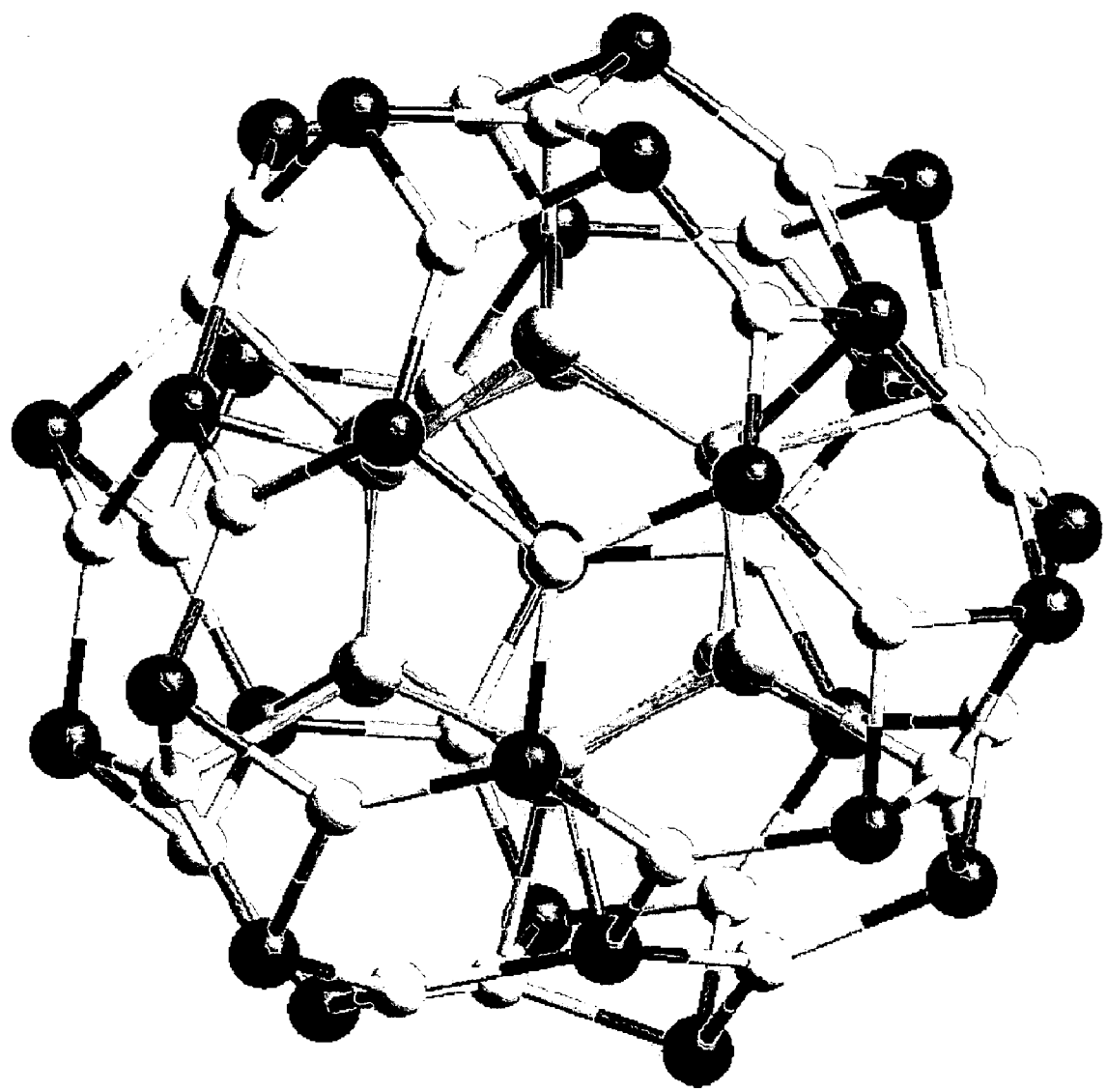
FIG. 5 is a second drawing showing a stable structure of $(CdSe)_{33}$ and $(CdSe)_{34}$.

By carrying out theoretical calculation of the first principle under conditions of the pseudopotential method, the structural stability of $(CdSe)_{33}$ and $(CdSe)_{34}$ was calculated. As a result, it was predicted that the hollow polyhedral particle structure in the form of a cage shown in FIG. 4 and FIG. 5 having surface structure in which a 4-membered ring and a 6-membered ring were combined would be stable. It was predicted that, as the number of the molecules of CdSe in which the particles were stable, 13 and the like would be present, in addition to 33 and 34. In fact, in the mass spectral chart shown in FIG. 2, a peak of $(CdSe)_{13}$ was present in addition to peaks of $(CdSe)_{33}$ and $(CdSe)_{34}$. Therefore, the accuracy of the theoretical calculation could be supported. It could be confirmed from this that $(CdSe)_{33}$ and $(CdSe)_{34}$ were hollow polyhedral fine particles. In addition, it was estimated that the maximum particle size of the $(CdSe)_{34}$ particle was 1.45 nm. This had good consistency with the actually observed datum by means of an electron microscope of from approximately 1.2 to 1.7 nm.

(5) Measurement by X-ray Diffraction

Figure 6:
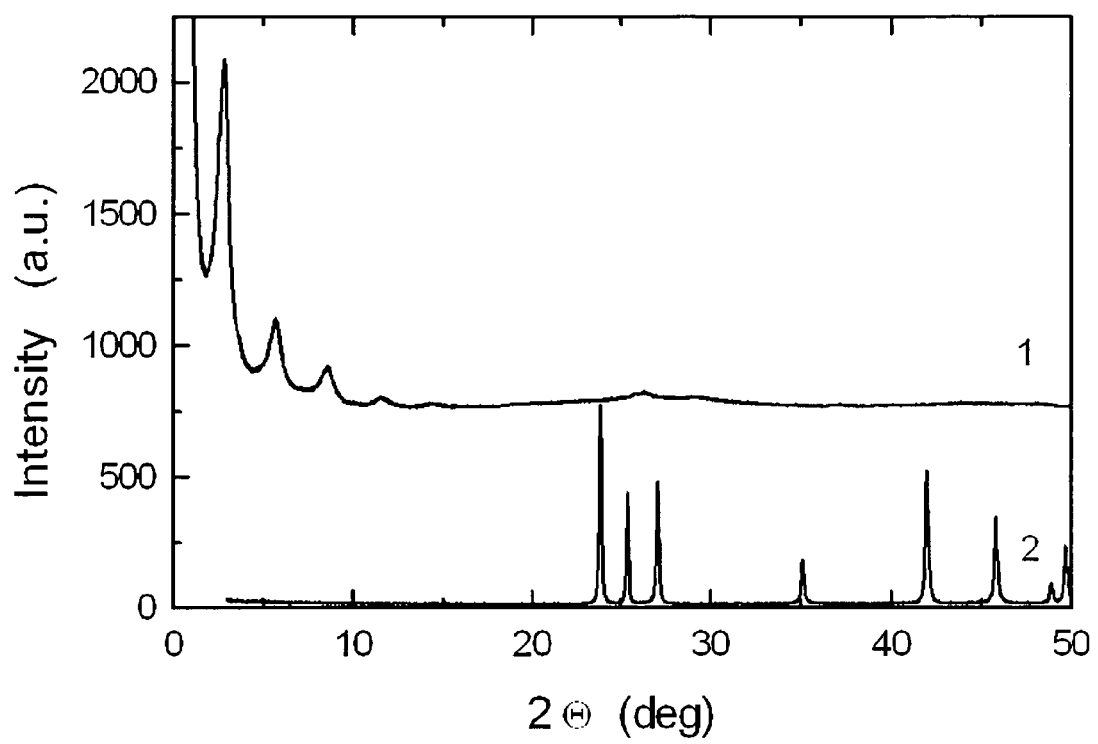
FIG. 6 is an X-ray diffraction spectral chart of the product obtained in Example 1.

The product obtained in Example 1 was subjected to measurement by X-ray diffraction under the conditions of powders employing a dried sample. As a source of the X ray, a Cu—Kα was employed. The results are shown in FIG. 6. In FIG. 6, peaks of Wurzite or Zincblend crystals at the vicinity of 2θ=25° appearing in bulk CdSe crystals were not observed. Therefore, it was reconfirmed that the product was not a bulk CdSe crystal.

In FIG. 6, some strong peaks were observed at the region of 2θ=not more than 20°. The first peak at 3.75° was the base peak for the following four high-order peaks. If it is assumed that the first peak is the [100] reflection of a simple cubic structure, the distance between the particles of the product was calculated as 2.37 nm. This was considerably greater than the size of the $(CdSe)_{33}$ and $(CdSe)_{34}$ particles. For this reason, it was believed that the surfactant adhering to the surface of the aforementioned particles had some effects thereon.

Therefore, the products of Example 2 and Example 3 employing the surfactants having different molecular lengths were subjected to measurement by X-ray diffraction under the same conditions as described above. As a result, in the products of Example 2 and Example 3, the distances between the particles of $(CdSe)_{33}$ and $(CdSe)_{34}$ were respectively 2.05 nm and 2.72 nm. From the results the changes in the distance between the particles were derived from the differences in molecular lengths of the surfactants (octylamine: approximately 1.0 nm; decylamine: approximately 1.2 nm; and dodecylamine: approximately 1.5 nm), and it was confirmed that molecules of the surfactant were present between the particles of $(CdSe)_{33}$ and $(CdSe)_{34}$ as spacers, as shown in the conceptual expression below.

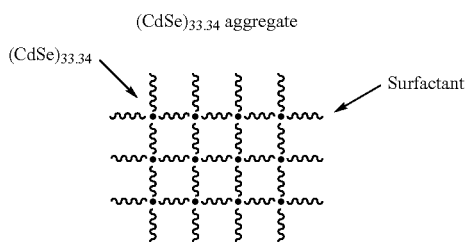

Measurement of Photoelectric Effects of the $(CdSe)_{33}$ and $(CdSe)_{34}$ Hollow Polyhedral Fine Particles:

On a Ti electrode, the $(CdSe)_{33}$ and $(CdSe)_{34}$ particles in which the surfactants were removed were deposited by means of electrophoresis, and their photoelectric effects were measured in a selenothiosulphytosodium solution under a xenon lamp. On the Pt electrode which was another electrode of the electrode couple, 0.55 V of photoelectric effects was observed.

INDUSTRIAL APPLICABILITY

The method for producing hollow polyhedral fine particles of the present invention is an organochemical synthetic method in which operations can be carried out at room temperature. For this reason, the method of the present invention can be carried out under mild conditions which are different from those in the case of high-energy consumption type synthetic methods such as a physical vapor growth method and the like, and can produce hollow polyhedral fine powders at high efficiency in large amounts.

The hollow polyhedral fine powders represented by chemical formulae of $(CdSe)_{33}$ and $(CdSe)_{34}$ produced by means of the production method of the present invention are nanoparticles stable in the atmosphere, and are novel substances which have not been synthesized heretofore. As described above, by employing the production method of the present invention, hollow polyhedral fine powders which are stable in the atmosphere, other than carbon fullerenes, can be actually synthesized.

In addition, the hollow polyhedral fine powders represented by chemical formulae of $(CdSe)_{33}$ and $(CdSe)_{34}$ produced by means of the production method of the present invention have electronic states which are different from those of bulk crystals of CdSe, and can be employed in various uses as novel functional materials, and in particular, as semiconductors. In particular, $(CdSe)_{33}$ and $(CdSe)_{34}$ can be regularly arranged, and for this reason, they can be employed as nanomolecular circuit devices.

The invention claimed is:

1. A method for producing hollow polyhedral fine particles having atoms of a first element and atoms of a second element, wherein atoms of said first element and atoms of said second element are structured to form a shell structure of the hollow polyhedral fine particle in a reversed micelle composed of a surfactant.

2. A method for producing hollow polyhedral fine particles having atoms of a first element and atoms of a second element, said method comprising the steps of:
   a first step of dissolving or dispersing a surfactant, a compound containing atoms of said first element, and a compound containing atoms of said second element, in an aqueous medium to obtain an aqueous solution or an aqueous dispersion;
   a second step of adding an oily medium to said aqueous solution or dispersion to obtain a double phase contacting liquid in which an aqueous phase and an oily phase directly contact;
   a third step of forming reversed micelles composed of said surfactant in said oily phase of said double phase contacting liquid; and
   a fourth step of structuring atoms of said first element and atoms of said second element in said reversed micelles to obtain hollow polyhedral fine particles.

3. The method for producing hollow polyhedral fine particles according to claim 2, further comprising a fifth step of separating and recovering said hollow polyhedral fine particles from said oily phase, after said fourth step.

4. The method for producing hollow polyhedral fine particles according to claim 2, wherein said first element and said second element are the same element.

5. The method for producing hollow polyhedral fine particles according to claim 2, wherein said first element and said second element are different elements.

6. The method for producing hollow polyhedral fine particles according to claim 5, wherein said first element is Cd, and said second element is Se.

7. A hollow polyhedral fine particle represented by the following chemical formula: $(CdSe)_{33}$ or $(CdSe)_{34}$.

8. The method for producing hollow polyhedral fine particles according to claim 1, wherein said first element and said second element are the same element.

9. The method for producing hollow polyhedral fine particles according to claim 1, wherein said first element and said second element are different elements.

10. The method for producing hollow polyhedral fine particles according to claim 9, wherein said first element is Cd, and said second element is Se.

11. A hollow polyhedral fine particle comprising:
atoms of a first element, and
atoms of a second element,
wherein atoms of said first element and atoms of said second element are structured to form a shell structure of the hollow polyhedral fine particle in a reversed micelle composed of a surfactant.

12. A hollow polyhedral fine particle according to claim 11, wherein said first element and said second element are the same element.

13. A hollow polyhedral fine particle according to claim 11, wherein said first element and said second element are different elements.

14. A hollow polyhedral fine particle according to claim 13, wherein said first element is Cd, and said second element is Se.

15. A hollow polyhedral fine particle according to claim 13, wherein said first element is selected from the group of Group II to Group VI elements.

16. A hollow polyhedral fine particle according to claim 15, wherein said first element is selected from the group of Group II elements.

17. A hollow polyhedral fine particle according to claim 16, wherein said first element is selected from the group of Cd and Zn.

18. A hollow polyhedral fine particle according to claim 15, wherein said second element is selected from the group of Group II to Group II to Group VI elements.

19. A hollow polyhedral fine particle according to claim 18, wherein said second element is selected from the group of Group VI elements.

20. A hollow polyhedral fine particle according to claim 19, wherein said second element is selected from the group of S, Se, and Te.

* * * * *

UNITED STATES PATENT AND TRADEMARK OFFICE
CERTIFICATE OF CORRECTION

PATENT NO. : 7,658,997 B2  Page 1 of 1
APPLICATION NO. : 10/540379
DATED : February 9, 2010
INVENTOR(S) : Kawazoe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Thirtieth Day of November, 2010

David J. Kappos
*Director of the United States Patent and Trademark Office*